Jan. 13, 1959

H. WELKER

SEMICONDUCTOR DEVICES OF NON-LINEAR CURRENT-VOLTAGE CHARACTERISTIC

Filed March 17, 1955

2,869,001

United States Patent Office 2,869,001
Patented Jan. 13, 1959

2,869,001

SEMICONDUCTOR DEVICES OF NON-LINEAR CURRENT-VOLTAGE CHARACTERISTIC

Heinrich Welker, Erlangen, Germany, assignor to Siemens-Schuckertwerke Aktiengesellschaft, Erlangen, Germany, a corporation of Germany Application March 17, 1955, Serial No. 495,007
Claims priority, application Germany March 18, 1954
8 Claims. (Cl. 307—88.5)

My invention relates to semiconducting resistance devices of non-linear current-voltage characteristic, such as rectifiers and other current controlling, converting or translating devices, which comprise as an essential component a semiconductor member of crystalline substance. More particularly, my invention relates to electric semiconductor devices whose operation involves the production of a "magnetic barrier layer" in the semiconductor member in accordance with the principles disclosed in my copending application for Controllable Electric Resistance Devices, Serial No. 297,788, filed July 8, 1952, and assigned to the assignee of the present invention, now Patent No. 2,736,858.

When an electric semiconductor member, for instance of germanium, is traversed by electric current in a given current-flow direction and is simultaneously subjected to a magnetic field having a component transverse to that flow direction, then the semiconductor member varies its electric resistance as a function of both the current intensity and the magnetic field strength. If, further, two oppositely located surfaces of the semiconductor member, both substantially parallel to the current-flow direction, are given respectively different recombination properties as regards their recombining effect upon the electrons (excess electron or negative electric charge carriers) and holes (defect electrons or positive charge carriers), then the resistance of the semiconductor member, electrically and magnetically acted upon as described above, becomes asymmetrical. That is, the semiconductor member then has rectifying properties due to the occurrence of a phenomenon which in the copending application as well as in the present disclosure is called "magnetic barrier layer." This phenomenon, more fully explained in the copending application, resides in the occurrence of crowding of the electron-hole pairs at the high surface-recombination side of the member and a corresponding depletion of electron-hole pairs at the low recombination side. The depleted zone of the member forms the "magnetic barrier layer" and has the effect that the member has higher resistance to current flow in one direction than to current flow in the opposite direction. The magnetic barrier layer can be given a very much larger thickness than obtainable with Schottky barrier layers as occurring in copper oxide or selenium rectifiers of the known type, or with the Shockley diffusion layers in known transistors; and it is also possible to control the thickness of the magnetic barrier layer electrically or magnetically. Thus, a magnetic barrier layer device can be given a larger current carrying capacity than the known barrier layers while lending itself to various control and regulating operations not obtainable with the normally invariable Schottky barrier layers. According to the above-mentioned copending application, the difference in surface recombination at opposite sides of the semiconductor member is obtained by applying correspondingly different surface treatments resulting in different surface textures, such as by polishing one surface for high surface recombination and etching the other surface for reduced surface recombination.

It is an object of the present invention to improve magnetic barrier layer devices generally cf the above-mentioned type so as to secure a barrier effect far beyond that heretofore attainable.

Another object of my invention, subsidiary to the art mentioned, is to minimize the requirements for surface treatment or to eliminate the need for applying a recombination-reducing surface treatment to the semiconductor member.

To achieve these objects, and in accordance with a feature of my invention, the magnetic barrier effect is greatly augmented by giving the semiconductor member a particular geometric shape such that the ratio of the surface of lower surface recombination to the surface of higher surface recombination is less than unity. That is, the surface area of low recombination is made smaller than the surface area of high recombination. I have discovered that such a geometric shape of a semiconductor member, subjected to electric current flow and to magnetic field strength as explained above, results in a barrier effect excelling that obtainable under otherwise similar conditions.

According to another feature of my invention, the semiconductor member in a device of the type described have arcuate shape, the surface of higher surface recombination being at the outer periphery and the terminal electrodes extending in substantially radial planes at the two ends respectively of the arcuate shape.

According to still another feature of my invention, the semiconductor member has the shape of a full cylinder or of a closed ring and has its terminal electrodes located on the two axial end faces respectively of the member.

These and further features of the invention, set forth with more particularity in the claims annexed hereto, are apparent from the several embodiments illustrated by way of example in the accompanying drawings.

In the drawings:

Figs. 1 to 3 are top views of various flat semiconductor members shaped in accordance with the invention; Fig. 4 is a top view of a closed, ring-shaped semiconductor member; Fig. 5 is a top view of a cylindrical semiconductor member;

Figures 1, 2, 3, 4, 5, 6, 7, 8, 9, 10, 11:
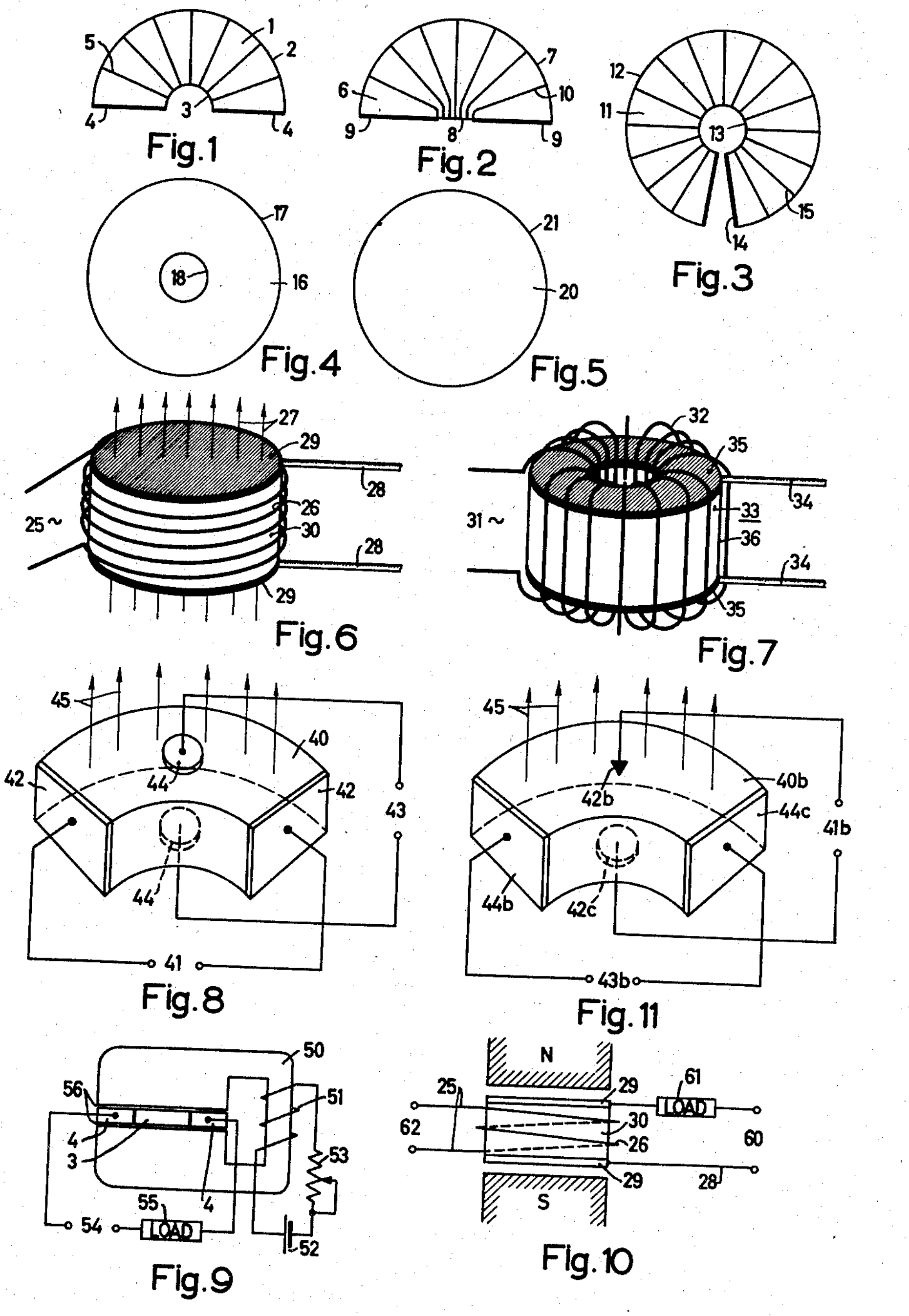
Figs. 6 and 7 are examples of electrical circuits in conjunction with the semiconductor members illustrated in Figs. 5 and 4, respectively.
Fig. 8 is a control circuit with controllable magnetic barrier layer resistance and wherein the control circuit lies parallel with the magnetic field.
Fig. 9 shows a circuit diagram of a device equipped with a semiconductor member according to Fig. 1.
Fig. 10 is a circuit diagram for a device equipped with a semiconductor member according to Figs. 5 and 6.
Fig. 11 shows schematically a modified device similar to that of Fig. 8.

The shape of the semiconductor member 1 in Fig. 1 is defined by two concentric semicircles. The outer peripheral surface 2 has greater surface recombination than the inner peripheral surface 3. This difference in recombination properties is obtained, for instance, by grinding and polishing the outer surface 2 while leaving the inner surface 3 unpolished or etching it or subjecting it to electrolytic attack. For example, the surface recombination at surface 3 of a semiconductor member of germanium can be reduced by etching this surface with the aid of diluted caustic soda to which some hydrogen peroxide is admixed, or by similarly applying other agents chemically attacking the germanium surface. Corresponding surface treatments for increased and reduced surface recombination may be applied to the other embodiments herein disclosed; and it will be understood that equivalent surface treatments are applicable if the semiconductor member consists of different substance such as silicon, aluminum nitride (AlN), aluminum phosphide (AlP), aluminum arsenide (AlAs), aluminum antimonide (AlSb), gallium nitride (GaN), gallium phosphite (GaP), gallium arsenide (GaAs), gallium antimonide (GaSb), indium arsenide (InAs), indium antimonide (InSb), boron phosphite (BP).

The above-described semiconductor member 1 is provided with electrodes 4 (Fig. 1) and is subjected to a magnetic field as shown in Fig. 9. In the illustrated example the field is produced by an electromagnet 50 whose coil 51 is excited from a current source 52 through a control rheostat 53. The electrodes 4 of the semiconductor member 1 are shown connected to alternating-current supply terminals 54 in series with a load 55 which in this case is energized by rectified current due to the barrier action of the device. The pole faces of the magnet 50 are preferably as close as feasible to the semiconductor member and are electrically insulated therefrom by two intermediate layers 56.

The modification of the semiconductor member shown in Fig. 2 is also of semi-cylindrical shape. The surface of greater surface recombination is designated by 7, and that with lesser surface recombination by 8. The electrodes are designated by 9.

The semiconductor member 11 shown in Fig. 3 is nearly ring-shaped. The outer peripheral surface 17 has greater surface recombination than the inner peripheral surface 18. The electrodes are designated by 14.

It will be recognized that in the embodiment of Fig. 1, the low-recombination area of surface 3 is only a fraction, namely one fourth, of the high-recombination area of surface 2; and similar conditions apply also to the embodiments of Figs. 2, 3 and those described below. While, as mentioned, this results in an augmented magnetic barrier effect, the favorable influence of the geometric shape upon that effect goes far beyond that caused merely by the difference in the size of the two areas. This is because the electric field strength in the vicinity of the surface of lesser surface recombination is especially great. In Figs. 1, 2 and 3 this is demonstrated by the illustrated equipotential lines 5, 10 and 15, respectively.

The semiconductor member 16 according to Fig. 4 forms a completely closed ring produced by centrally boring a solid preferably monocrystalline semiconductor cylinder. The outer peripheral surface 17 has greater surface recombination than the inner peripheral surface 18. If the inner surface 18 of Fig. 4 of lesser surface recombination is allowed to become increasingly smaller, a cylindrical semiconductor member 20 is ultimately obtained having an outer cylinder surface 21 of great surface recombination. Semiconductor members of this kind have the advantage of obviating the need for producing a surface of slight surface recombination. There remains only the very much lesser task of promoting a large surface recombination at the outer surface.

When using semiconductor members of the shapes illustrated in Figs. 4 and 5, the electrical field must be inductively applied to the semiconductor crystal to produce the barrier layer effect. Corresponding circuits for this purpose are presented in Figs. 6 and 7. According to Fig. 6 a circular electrical field is induced in the semiconductor 30 by means of a coil 26 in an alternating-current control circuit 25. The circulating current thus produced in member 30 induces a magnetic field as indicated in Fig. 6 by arrows 27. The circuit 28 to be controlled is connected to the electrodes 29 of the semiconductor member 26.

In the circuit diagram of Fig. 10, the circuit 28 is connected to power-supply terminals 60 in series with a load to be controlled by alternating control current supplied to the terminals of the coil circuit 25. The member 30 is disposed between the poles N and S of a magnet. Thus the field of the magnet is superimposed upon the above-mentioned field (27 in Fig. 6) induced by the circulating current inductively generated by the ampere turns of coil 26. If the superimposed field of the magnet is kept constant or the magnet N—S is a permanent magnet, the resistance of member 30 in circuit 28 will vary in dependence upon the current variations in control circuit 25 so that the power current supplied to the load 61 is controlled by the signal applied to terminals 62. The device thus serves as a current amplifier or as a controllable rectifier depending upon whether properly poled direct-current or alternating-current is applied to the load circuit. It will be noted that in the embodiment of Figs. 6 and 10 the induced circulating current in semiconductor member 30 that, in coaction with the applied magnetic field, causes a resistance variation or magnetic barrier effect in the member is not identical with the load current upon which this effect is imposed for controlling or rectifying purposes.

Fig. 7 illustrates an example of a device with a toroidal semiconductor member 33 similar to that of Fig. 4. A circular magnetic field is induced in member 33 by a coil 32 connected in an alternating-current control circuit 31. The controlled circuit 34 is connected to ring-shaped electrodes 35. This device can also be used as an amplifier, rectifier and the like, in a similar manner as explained with reference to Figs. 6 and 10.

In certain cases of application, the alternating field of coil 32 (Fig. 7) can be dispensed with, the magnetic action then being limited to the magnetic field produced by the controlled circuit. Thus, the current flowing in the controlled circuit 34 and through the semiconductor member 33 produces a ring-shaped magnetic field about the current path in the semiconductor member.

In embodiments of the kind shown in Figs. 6 and 7, the electron-hole pairs, in certain phases of operation, will be crowded toward the outer peripheral surface (30 or 36) of great surface recombination due to the forces (Lorentz forces) resulting from the conjoint effects of the electric and magnetic fields. This produces in the semiconductor member a magnetic barrier layer which, as explained above, is controlled by the control circuits (25 or 31) to produce a corresponding resistance variation in the circuits (28 or 34) to be controlled.

Figs. 6 and 7, together with Fig. 8 still to be described, represent three fundamentally different cases as regards the relative orientation of the semiconductor member, the electric control field, the magnetic field, and the field to be controlled. As mentioned, the production of a magnetic barrier layer requires that the magnetic field have a component perpendicular to the electric field. When the electric control field is perpendicular to the magnetic field as, for example, in Fig. 7, then the controlled electric field may be perpendicular to the magnetic field likewise as in Fig. 7; and the functions of the controlling circuit and the controlled circuit can be interchanged. This kind of control is characterized by a strong feed-back reaction of the controlled circuit upon the controlling circuit. This is because the controlled field, being perpendicular to the magnetic field, contributes to producing the magnetic barrier layer.

This reaction of the controlled circuit upon the controlling circuit does not take place when, as in Fig. 6 or in Fig. 8, the controlled current path lies parallel to the magnetic field. According to Fig. 8, the controlling circuit 41 is connected through the electrodes 42 to the semiconductor member 40. The controlled circuit 43 is connected to further electrodes 44. The direction of the applied magnetic field is indicated by the arrows 45.

Furthermore, the control field may be applied parallel to an independently excited magnetic field. Then the thickness of the magnetic barrier layer cannot be controlled by means of the electrical control field and it is necessary to apply injection control. Such injection control consists in varying the marginal density of the magnetic barrier layer by injecting electrons or holes with the aid of an electrode attached to the semiconductor member as shown in Fig. 11. The semiconductor device of Fig. 11 is generally similar to that of Fig. 8, except that the controlling circuit and the controlled circuit are mutually exchanged and one of the electrodes **42*b*, 42*c* in the controlling circuit 41*b* is designed as a point electrode 42*b*. In Fig. 11, the controlled circuit 43*b* is connected to the electrodes 44*b* and 44*c*. The semiconductor body 40*b* is subjected to an extraneously applied magnetic field to produce a barrier layer as described with reference to Fig. 8; and the barrier layer is controlled by injection of charge carriers through the electrode 42*b* in the controlling circuit 41*b***.

The invention is generally applicable with any semiconductor substances, including Ge, Si, AlN, AlP, AlAs, AlSb, GaN, GaP, GaSb, GaAs, InP, InAs, InSb, BP, HgSe, ZnS, CdTe, HgTe. However, since the magnitude of the magnetic forces imposed upon the electrons and holes is proportional to their velocity and since this velocity for a given electric field is proportional to the mobility of the charge carriers, it is preferable for the purposes of the invention to employ a semiconductor substance of high carrier mobility, this mobility ($cm.^2$/volt sec.) being defined as the velocity of the charge carriers measured in centimeter per second in an electric field of one volt per centimeter. For that reason the semiconductor member should be made of germanium having a carrier mobility of about 3000 $cm.^2$/volt sec. or of compounds having carrier mobilities of about 6000 or more. For instance, indium antimonide (InSb) or indium arsenide (InAs) are particularly suitable because they afford carrier mobilities up to about 20,000 or more. Favorable are also various other semiconducting compounds of the type $A_{III}B_V$ described in my copending application Serial No. 275,785, filed March 10, 1952, for Semiconductor Devices and Methods of Their Manufacture, assigned to the assignee of the present invention. With germanium (3000 $cm.^2$/volt sec.) the application of a magnetic field of 10,000 Gauss results in a magnetic force acting upon the electrons which has a ratio to the electric force acting upon the electrons equal to $$3000\times 10{,}000\times 10^{-8}=0.3.$$

By using the binary compounds above mentioned, the magnetic force can be made as large or larger than the electric force so that the magnetic barrier effect becomes particularly pronounced.

For producing the magnetic barrier effect the substance employed may be an intrinsic semiconductor. In an intrinsic semiconductor, as here understood, the electrons and holes in the thermal equilibrium have respective concentrations of the same order of magnitude. That is, the concentration of the electrons is at most about ten times the concentration of the holes, or vice versa. A semiconductor in which a greatly preponderant electron concentration is accompanied by a small but still appreciable hole concentration or vice versa is considered still to belong to the intrinsic type with regard to the present invention. However, I have found it preferable to use for the purposes of the invention substantially intrinsic semiconductors having about balanced, or only little different, electron and hole concentrations up to the above-mentioned approximate limit. As is well known, extrinsic semiconductance is due to imperfections of a nearly perfect crystal lattice caused, for instance, by the presence of slight amounts of substitutional (donor or acceptor) impurities.

Devices according to the invention are applicable for various measuring, detecting, controlling, regulating, or translating purposes. It will be understood from the foregoing that for such purposes any one or several of the barrier-layer controlling factors can be varied, such as the strength of the magnetic field, the strength of the electric field or current in the semiconductor member, the relative position or angular relation of the magnetic field to the electric field, this being more fully described in my above-mentioned co-pending application Serial No. 297,788. It will therefore be understood by those skilled in the art that the invention permits of various embodiments, modifications and uses other than those herein specifically disclosed, without departing from the essential features of the invention as set forth in the claims annexed hereto.

I claim:

1. An electric semiconductor device of non-linear current-voltage characteristic, comprising a substantially intrinsic semiconductor member having two terminal electrodes spaced from each other for passing through said member an electric current to be controlled, means for producing a magnetic field in said member, said member having two surfaces extending substantially in respective planes transverse to the direction of said magnetic field and having two other surfaces of respectively low and high surface recombination extending between said electrodes, each of said two other surfaces having one dimension substantially parallel to said direction and another dimension transverse to said direction, said two latter surfaces having respective areas of a ratio less than unity.

2. An electric semiconductor device of non-linear current-voltage characteristic, comprising a substantially intrinsic semiconductor member having an outer peripheral surface of a substantially uniform curvature, two terminal electrodes mounted on said member and spaced from each other for passing through said member an electric current to be controlled, means for producing a magnetic field in said member, said member being oriented relative to said magnetic field so that the plane of said curvature is substantially perpendicular to the direction of said magnetic field.

3. An electric semiconductor device of non-linear current-voltage characteristic, comprising a semiconductor member of arcuate shape, two terminal electrodes mounted on said member for passing electric current through said member, said electrodes being located on respectively different planes extending substantially radially of said shape and being spaced from each other, said member having an arcuate surface of high surface recombination extending between said electrodes and forming the outer side of said arcuate shape, said member having a surface of low surface recombination extending between said electrodes on the opposite side of said shape and being smaller in area than said arcuate surface, means for producing a magnetic field in said member, said member being oriented in said field so that said two surfaces are spaced from each other in a direction substantially perpendicular to that of said magnetic field.

4. In an electric semiconductor device according to claim 2, said substantially intrinsic semiconductor member having annular shape and having, aside from said outer peripheral surface, an inner peripheral surface and two annular end faces, said two terminal electrodes being mounted on said respective end faces for passing said current through said member, and said means for producing said magnetic field comprising a field coil surrounding said member.

5. In an electric semiconductor device according to claim 2, said substantially intrinsic semiconductor member having substantially cylindrical shape and having a polished cylindrical outer surface and two axially spaced end faces, said two terminal electrodes being mounted on said respective end faces, and said means for producing said magnetic field comprising a field coil surrounding said member for inducing electric and magnetic fields therein.

6. In an electric semiconductor device according to claim 2, said semiconductor member having two axially opposite end faces and said terminal electrodes being mounted on said respective end faces, said magnetic-field producing means comprising a coil and a control circuit connected to said coil to supply controlling current thereto, said coil having in said member a magnetic-field direction substantially perpendicular to the direction of spacing between said electrodes, and an output circuit connected to said electrodes for providing controlled current in dependence upon said controlling current, the electric field produced in said member by said controlled current being substantially parallel to the magnetic field produced in said member by said magnetic-field producing means.

7. In a semiconductor rectifying device according to claim 2, said substantially intrinsic semiconductor member having semi-annular shape and having planar top and bottom surfaces, two parallel arcuate side surfaces radially spaced from each other, and a pair of end faces extending in respective radial planes perpendicular to said top and bottom surfaces; said two terminal electrodes being mounted on said respective end surfaces, and a rectifying circuit including a direct-current load connected in series with said electrodes.

8. In a semiconductor amplifying device according to claim 2, said semiconductor member having cylindrical shape and having substantially parallel, spaced end surfaces, said two terminal electrodes being mounted on said respective end surfaces, said field means comprising an input circuit having a magnetic winding surrounding said member and means for supplying a fixed magnetic field in an axial direction in said member, and an output circuit including a load connected to said terminal electrodes.

References Cited in the file of this patent

UNITED STATES PATENTS

| | | |
|---|---|---|
| 1,765,607 | Ohl | June 24, 1930 |
| 2,597,028 | Pfann | May 20, 1952 |
| 2,714,182 | Hewitt | July 26, 1955 |